US008866585B2

(12) United States Patent
Finkenzeller et al.

(10) Patent No.: US 8,866,585 B2
(45) Date of Patent: Oct. 21, 2014

(54) METHOD FOR CHALLENGE RESPONSE AUTHENTICATION BETWEEN A READING DEVICE AND A TRANSPONDER USING CONTACTLESS DATA TRANSMISSION

(75) Inventors: Klaus Finkenzeller, Unterfohring (DE); Gisela Meister, Munich (DE); Dirk Wacker, Munich (DE)

(73) Assignee: Giesecke & Devrient GmbH, Munich (DE)

( * ) Notice: Subject to any disclaimer, the term of this patent is extended or adjusted under 35 U.S.C. 154(b) by 428 days.

(21) Appl. No.: 13/126,018

(22) PCT Filed: Oct. 26, 2009

(86) PCT No.: PCT/EP2009/007654
§ 371 (c)(1),
(2), (4) Date: Apr. 26, 2011

(87) PCT Pub. No.: WO2010/049112
PCT Pub. Date: May 6, 2010

(65) Prior Publication Data
US 2011/0205015 A1    Aug. 25, 2011

(30) Foreign Application Priority Data

Oct. 27, 2008  (DE) .......................... 10 2008 053 369

(51) Int. Cl.
*G06F 7/04* (2006.01)
*H04L 9/32* (2006.01)
*H04L 29/06* (2006.01)
*H04W 12/06* (2009.01)

(52) U.S. Cl.
CPC ............. *H04W 12/06* (2013.01); *H04L 9/3271* (2013.01); *H04L 63/0492* (2013.01); *H04L 2209/805* (2013.01)
USPC ............ 340/5.8; 340/10.2; 340/3.41; 340/5.2

(58) Field of Classification Search
CPC ..................... H04L 2209/805; H04L 63/0492; H04L 9/3271; H04W 12/06
USPC ................... 340/5.8, 10.2, 5.2, 3.41
See application file for complete search history.

(56) References Cited

U.S. PATENT DOCUMENTS 8,085,131 B2 * 12/2011 Park et al. ..................... 340/10.2
2007/0063055 A1 * 3/2007 Graf et al. ..................... 235/492
2009/0199206 A1   8/2009 Finkenzeller et al.

FOREIGN PATENT DOCUMENTS

DE        102006027200 A1    12/2007

OTHER PUBLICATIONS

Martin Feldhofer, An Authentication Protocol in a Security Layer for RFID Smart Tags, May 2004, XP010734683.*

(Continued)

*Primary Examiner* — Brian Zimmerman
*Assistant Examiner* — Bhavin M Patel
(74) *Attorney, Agent, or Firm* — Workman Nydegger

(57) ABSTRACT

A method and system for challenge-response authentication are provided. Challenge data are transferred within an anti-collision loop from a reading device to a transponder by means of one or more commands of an anti-collision method, with the one or more commands serving to determine transponder identification data. In the one or more commands respective challenge data are contained in a data field that is used for specifying transponder identification data, wherein it is indicated to the transponder by a parameter value in the at least one of the one or more commands that the data field of the one or more commands contains challenge data instead of transponder date. The transponder recognizes with the help of the parameter value that in the received one or more commands challenge data are contained. The transponder processes the transferred challenge data based on the challenge response authentication.

22 Claims, 7 Drawing Sheets

(56) References Cited

OTHER PUBLICATIONS

Figure 1:
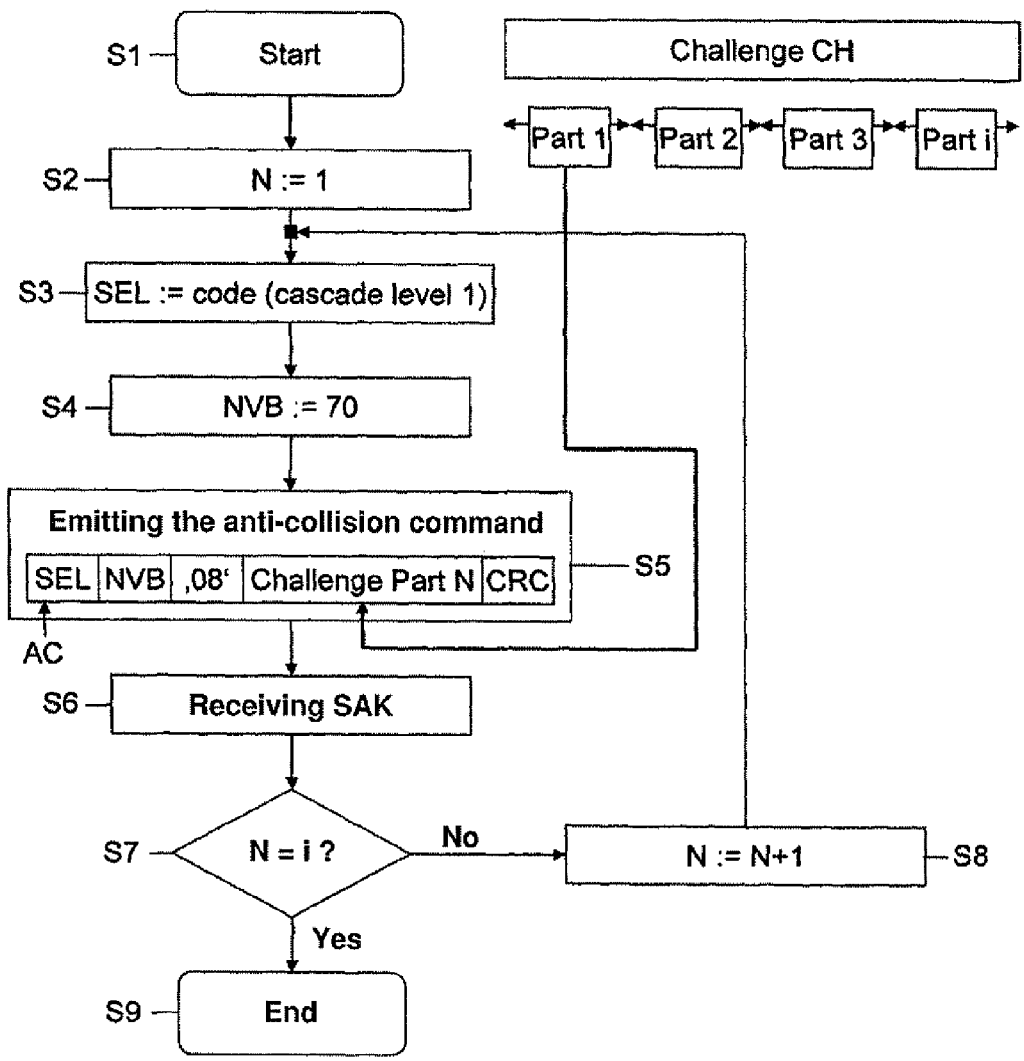

Feldhofer, M., "An Authentication Protocol in a Security Layer for RFID Smart Tags", IEEE MELECON 2004, May 12-15, Dubrovnic, Croatia, pp. 759-762.

Feldhofer, M., "A Proposal for an Authentication Protocol in a Security Layer for RFID Smart Tags", Stiftung Secure Information and Communication Technologies SIC, 2003, http://www.avione.net/rfid/.

ISO/IEC 14443-4, "Identification Cards—Contactless Integrated Circuits(s) Cards—Proximity Cards", Feb. 1, 2001, pp. 1-34.

ISO/IEC 14443-3, "Idenfication Cards—Contactless Integrated Circuits(s) Cards—Proximity Cards", Feb. 1, 2011, pp. I-VII, 1-48.

International Search Report in PCT/EP2009/007654, May 20, 2010.

Finkenzeller, H.V., RFID Handbook, 2nd Ed., (2003), Ch. 7.2.4, pp. 206-219.

* cited by examiner

METHOD FOR CHALLENGE RESPONSE AUTHENTICATION BETWEEN A READING DEVICE AND A TRANSPONDER USING CONTACTLESS DATA TRANSMISSION

The invention relates to a method for challenge-response authentication between a reading device and a transponder based on a contactless data transmission.

The invention lies in the technical field of contactless transmission of data between a reading device and a transponder. Therein in the response field of a reading device pieces of information are exchanged in a contactless fashion between the reading device and the transponder, with the transponder for example being a portable data carrier, in particular in the form of a chip card.

For checking authenticity between a transponder and a reading device according to the state of the art authentication methods are used, for example the sufficiently known challenge-response authentication. The data required herein are usually transmitted on the basis of a communication protocol. When a transponder enters the response field of a reading device, however, first a communication relationship must be established between these two units, and the required protocol parameters must be exchanged before the actual challenge-response authentication can be carried out. Since in the case of contactless transponders it must always be assumed that there are other transponders present in the response field of the reading device, first a so-called anti-collision method is carried out. This method serves to select one single transponder on the basis of the analysis of bit collisions. After singling out a transponder subsequently the transmission protocol is initialized on the transponder and the authentication is carried out.

From the state of the art different anti-collision methods between reading devices communicating in a contactless fashion and transponders are known. In principle these methods determine the unique serial numbers sent by the transponders, so as to select a transponder with the help of its serial number on this basis. Here deterministic anti-collision methods, such as e.g. the binary search method, or stochastic methods, such as "Slotted Aloha" can be used. In the RFID Handbuch (RFID hand book) by Klaus Finkenzeller, Hanser Verlag, $4^{th}$ edition, 2006 in chapter 7.2.4 (pages 220 to 234) there are described different anti-collision methods according to the state of the art.

In the challenge-response authentications known from the state of the art between the transponder and the reading device it is disadvantageous that a communication relationship between the transponder and the reading device has to be built up completely before the execution of the authentication. This means that first an anti-collision method must be run through and subsequently a transmission protocol has to be initialized. Consequently the authentication requires an elaborate implementation of a protocol and is connected with time delays, since an anti-collision method must be carried out first.

It is consequently the object of the invention to create a challenge-response authentication between a reading device and a transponder which can be carried out with little effort and within a short time.

This object is achieved through the method according to patent claim 1 and/or the system according to patent claim 18 and/or the reading device according to patent claim 20 and/or the transponder according to patent claim 21. Further developments of the invention are defined in the dependent claims.

In the inventive method challenge data are transmitted from the reading device to the transponder by means of one or several commands of an anti-collision method within an anti-collision loop of the anti-collision method, with the command or commands serving to determine transponder identification data from transponders in the field of the reading device. Therein in a respective command challenge data are transferred in a data field that is used for specifying transponder identification data, wherein through a parameter value in at least one of the commands, e.g. in all commands or only in the first command of the anti-collision loop, it is indicated to the transponder that the data field of the command or commands contains challenge data instead of transponder identification data.

The transponder used in the inventive method then recognizes by means of the parameter value in the at least one command that challenge data are transmitted with the commands, with the transponder suitably processing the transmitted challenge data on the basis of the challenge-response authentication. In particular the transponder, within the framework of the authentication after the complete transmission of the challenge data, returns response data to the reading device.

According to the invention consequently an anti-collision method which is known per se is used for transmitting authentication data in the form of challenges and/or responses. This is rendered possible in that in corresponding commands of an anti-collision method which actually serve to determine transponder identification data for singling out transponders now challenge data are transferred. The unconventional use of these commands is indicated to a transponder supporting the inventive method through a corresponding choice of a parameter. For example a transponder can recognize from an untypical choice of the parameter value in an anti-collision loop (in particular at the start of the anti-collision loop) that challenge data are transferred in the corresponding commands of the anti-collision loop.

In a particularly preferred embodiment of the inventive method the binary search method sufficiently known from the state of the art is used as anti-collision method, in particular the dynamic binary-search method. In the above-mentioned RFID hand book there is a description of the dynamic binary-search method in chapter 7.2.4.3.1. Furthermore, for the contactless communication between the reading device and the data carrier preferably the ISO 14443 standard sufficiently known from the state of the art is used. In this case the used commands of the anti-collision method are SEL commands and the data field for specifying the transponder identification data is a UID data field for specifying the UID of a transponder. Furthermore the parameter value by which it is specified that challenge data are transmitted is the NVB value (NVB=number of valid bits) of the respective SEL command, with the NVB value indicating the number of bits of the UID (i.e. of the serial number) of the transponder which are known in the reading device, and wherein it is indicated to the transponder by an NVB value, according to which at least a part of the bits, e.g. all bits, of the UID of the transponder are known, that in the UID data field of the SEL command challenge data are transmitted instead of the UID.

In a preferred variant of the inventive method the transmission of the challenge data to the transponder in several parts via several commands is supported. Therein the transponder transfers, after receipt of a respective command, a respective response to the reading device, whereupon the reading device, after receipt of the response, transfers to the transponder a new command with a part of the challenge data not yet transferred to the transponder, provided that not all challenge data were transferred to the transponder yet.

In a particularly simple variant of the inventive method by way of response of the transponder an SAK acknowledgment according to the ISO 14443 standard is transferred. This variant is used in particular when the NVB value in a SEL command of the reading device indicates that all bits of the transponder's UID are known.

In a further variant of the inventive method the response of the transponder contains a data field which is used for transmitting transponder identification data of the transponder, with the data field comprising a random number and/or a predetermined bit sequence instead of the transponder identification data. As data field there is used in particular a UID data field for transmitting the transponder's UID in accordance with the ISO 14443 standard. Preferably the above-described variant of a response of the transponder is used when the NVB parameter of a SEL command indicates that merely a part of the bits of the transponder UID is known.

The respective response emitted by the transponder preferably contains also the information that the response contains a random number and/or a predetermined bit sequence, with the reading device being capable of recognizing this information. The information that the response comprises a random number and/or a predetermined bit sequence can be indicated for example through the simulation of a bit collision in the response, with a method enabling a transponder to simulate a bit collision being described in the German patent application DE 10 2006 027 200. The complete disclosure of this application is included in the content of the present application through reference.

With the aid of the above-described information the reading device can recognize when responses are transmitted to the reading device by more than one transponder. For if the reading device receives a response which does not comprise the information that the response contains a random number and/or a predetermined bit sequence, it can be concluded from this that several transponders are present in the field of the reading device. Subsequently, instead of the inventive method, a regular anti-collision method can be carried out so as to single out the transponders.

In a further preferred variant of the inventive method the random numbers and/or predetermined bit sequences of the respective responses are used by the reading device after the transmission of the challenge data for selecting the transponder.

To transmit corresponding response data in response to the challenge data in a preferred variant after the transmission of the challenge data a further anti-collision loop is run through, in which the response data are transferred from the transponder to the reading device by means of one or several responses of the anti-collision method, with the response data being contained in a data field of the response which actually serves to transfer transponder identification data.

In a further embodiment of the inventive method in the further anti-collision loop one or several SEL commands are transmitted from the reading device to the transponder, wherein the SEL commands are responded to by the transponder with responses containing response data, and wherein in a respective SEL command it is indicated by the NVB value that no bit of the transponder's UID is known to the reading device. The response data are consequently transmitted in a UID data field of maximum length.

In a preferred variant the further anti-collision loop is ended in that, in a selection command of the anti-collision method, the reading device transmits to the transponder response data received from the transponder before.

In a further embodiment of the inventive method in a further anti-collision loop furthermore, after the transmission of the response data from the transponder to the reading device, again response data are transmitted from the reading device to the transponder. Preferably the response data are transmitted from the transponder to the reading device in such a fashion that from the reading device to the transponder subsequent SEL commands (if applicable with variable and/or increasing NVB value) are transferred, which are responded to by the transponder with responses containing response data. In doing so, preferably the NVB values of the respective SEL commands indicate that only a part of the bits of the transponder's UID is known. For identifying that the responses contain response data, preferably furthermore a bit collision is simulated in the respective response. In contrast the response data are transferred from the reading device to the transponder preferably in the UID data field using subsequent SEL commands (if applicable with variable and/or increasing NVB value).

Besides the above-described method the invention furthermore comprises a system for contactless challenge-response authentication, comprising a reading device and a transponder, which in operation interact in such a fashion that every variant of the inventive method can be executed with the system.

The invention furthermore relates to a reading device for use in the inventive system, which is designed in such a fashion that during operation it emits challenge data by means of one or several commands of an anti-collision method for determining transponder identification data within an anti-collision loop, wherein in the command or commands respective challenge data are contained in a data field used for specifying transponder identification data, wherein it is indicated by a parameter value in the command or in at least one of the commands that the data field of the command or commands contains challenge data instead of transponder identification data.

The invention furthermore comprises a corresponding transponder for use in the inventive system, which in operation recognizes with the help of a parameter value in the respective received command of an anti-collision method that challenge data are transferred in the command, with the transponder processing the transferred challenge data on the basis of a challenge-response authentication.

Embodiments of the invention will be described in detail subsequently with reference to the enclosed figures.

Figure 2:
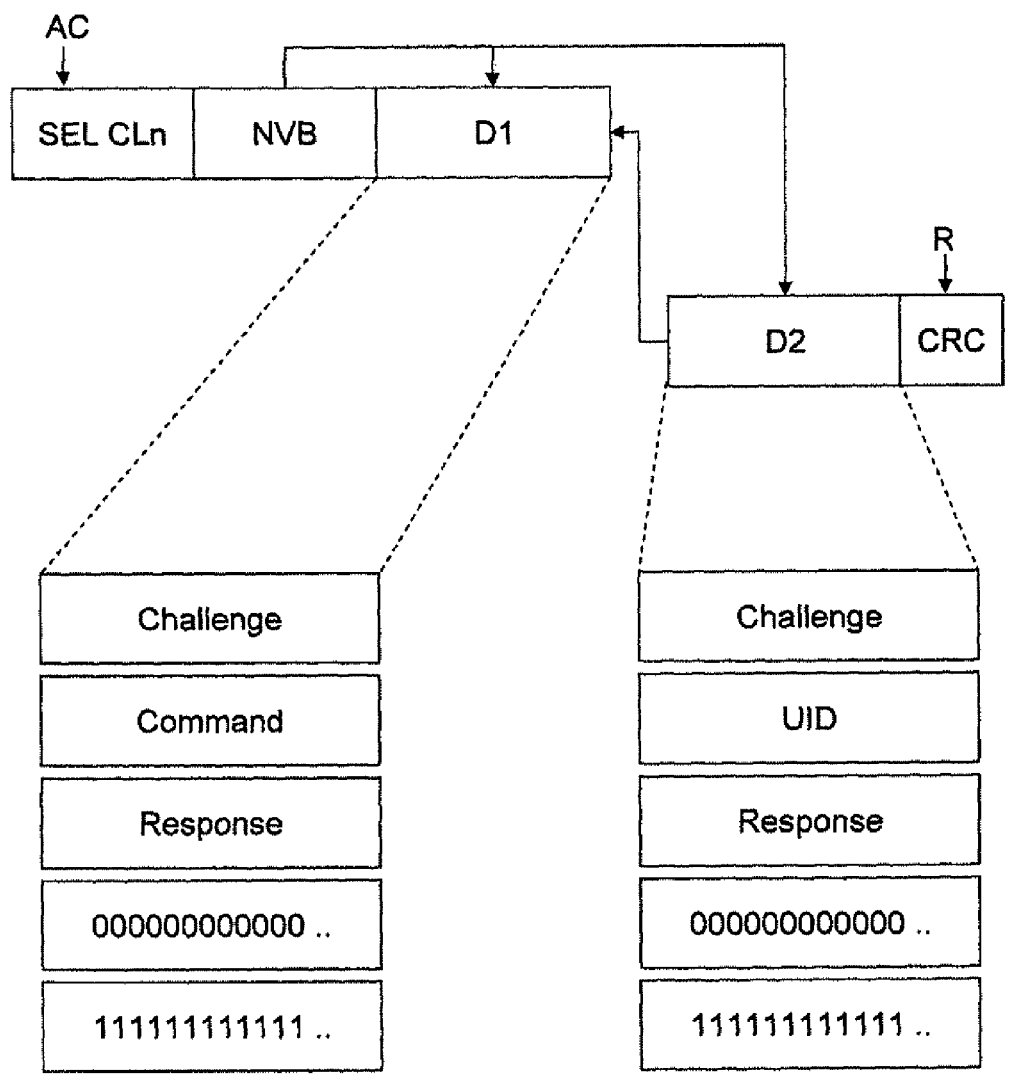
Figure 3:
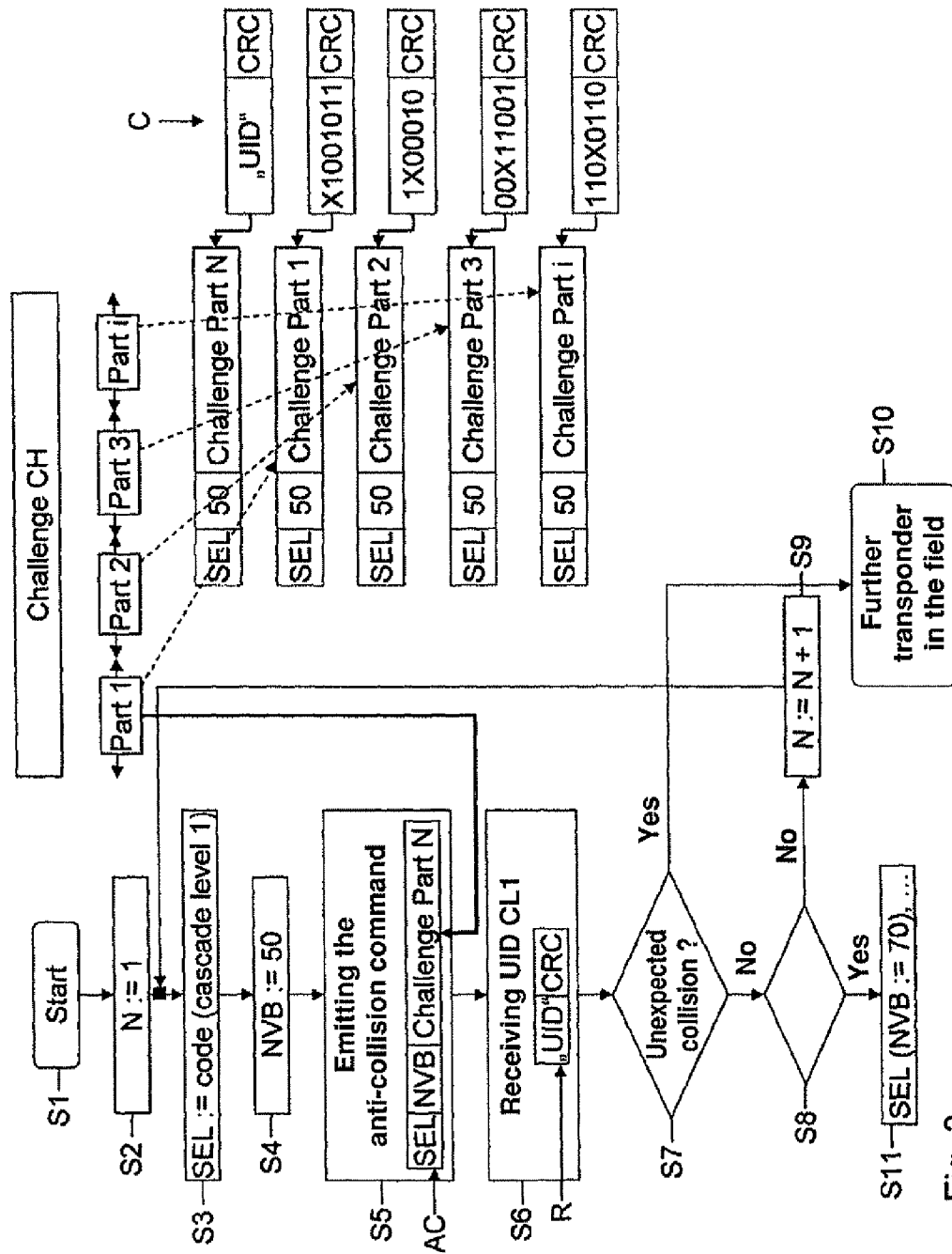
Figure 4:
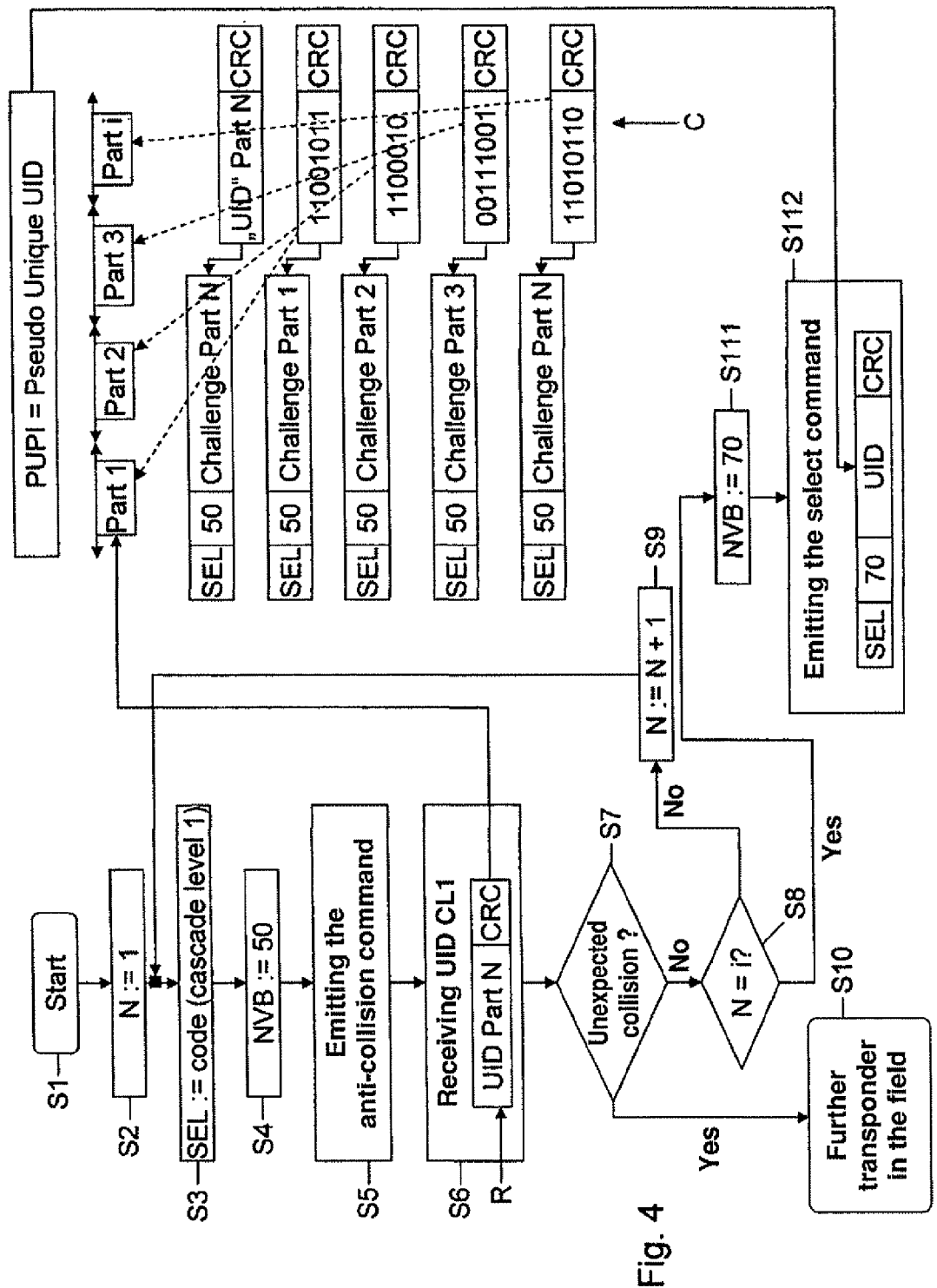
Figure 5:
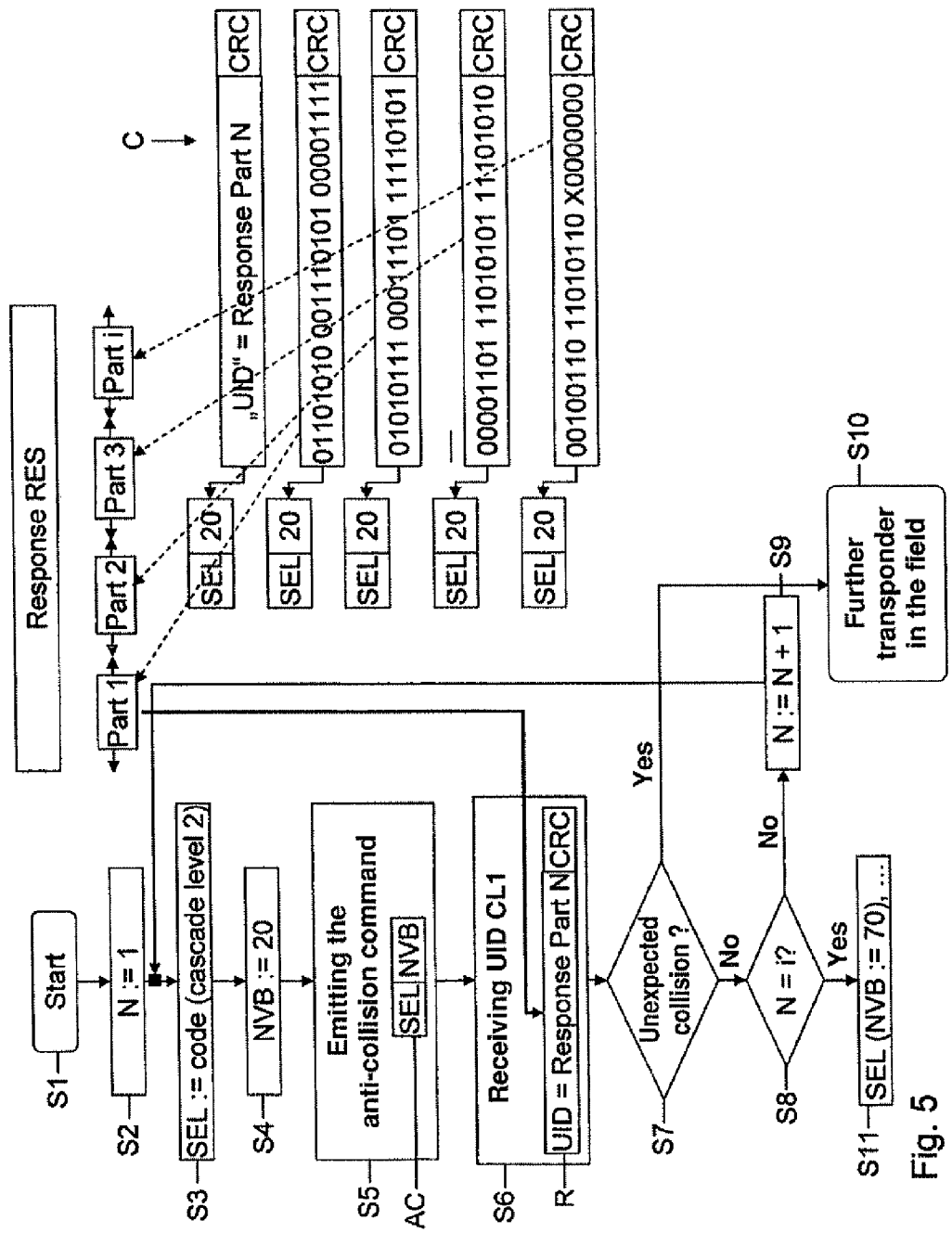
Figure 6:
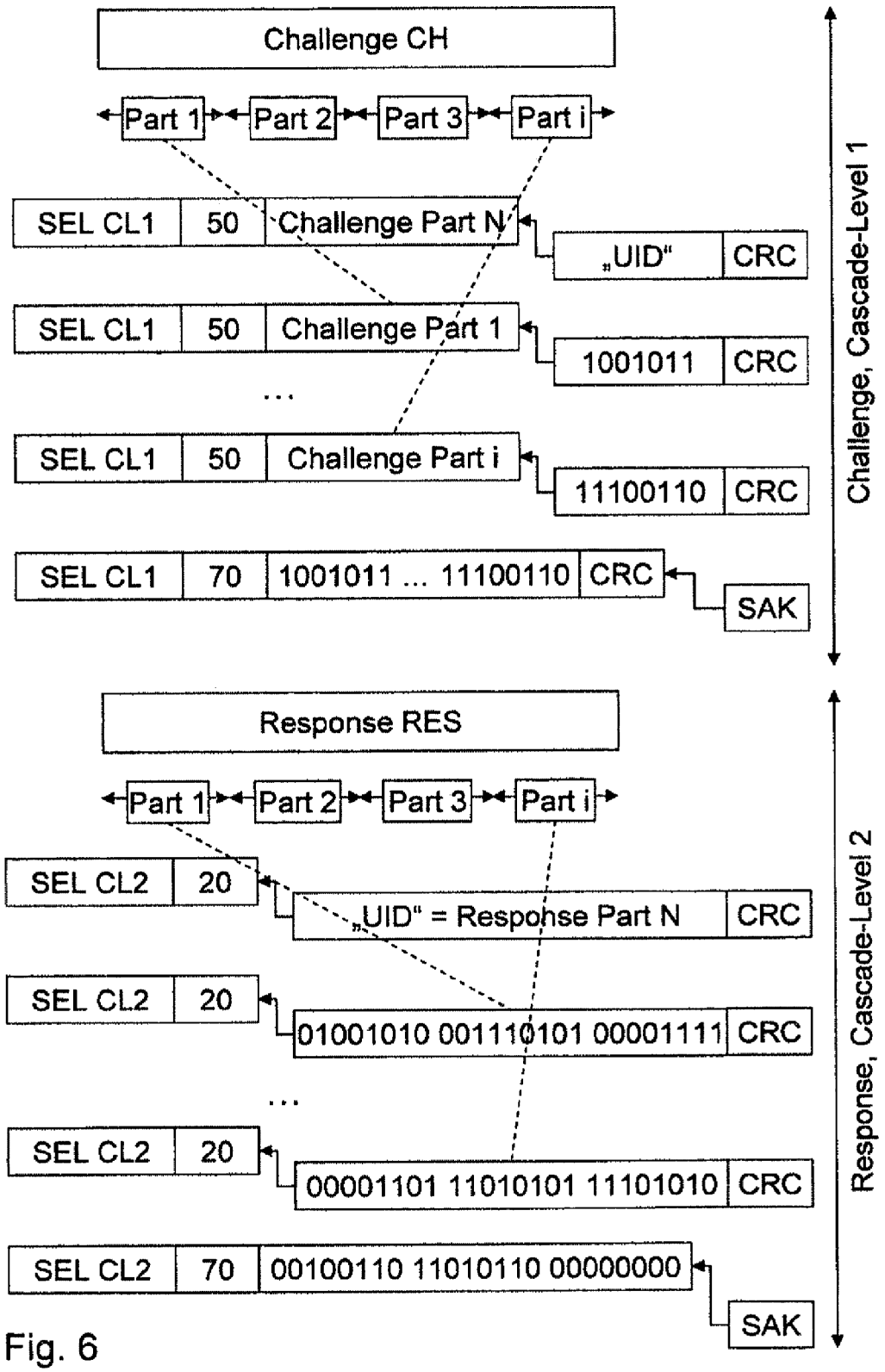
Figure 7:
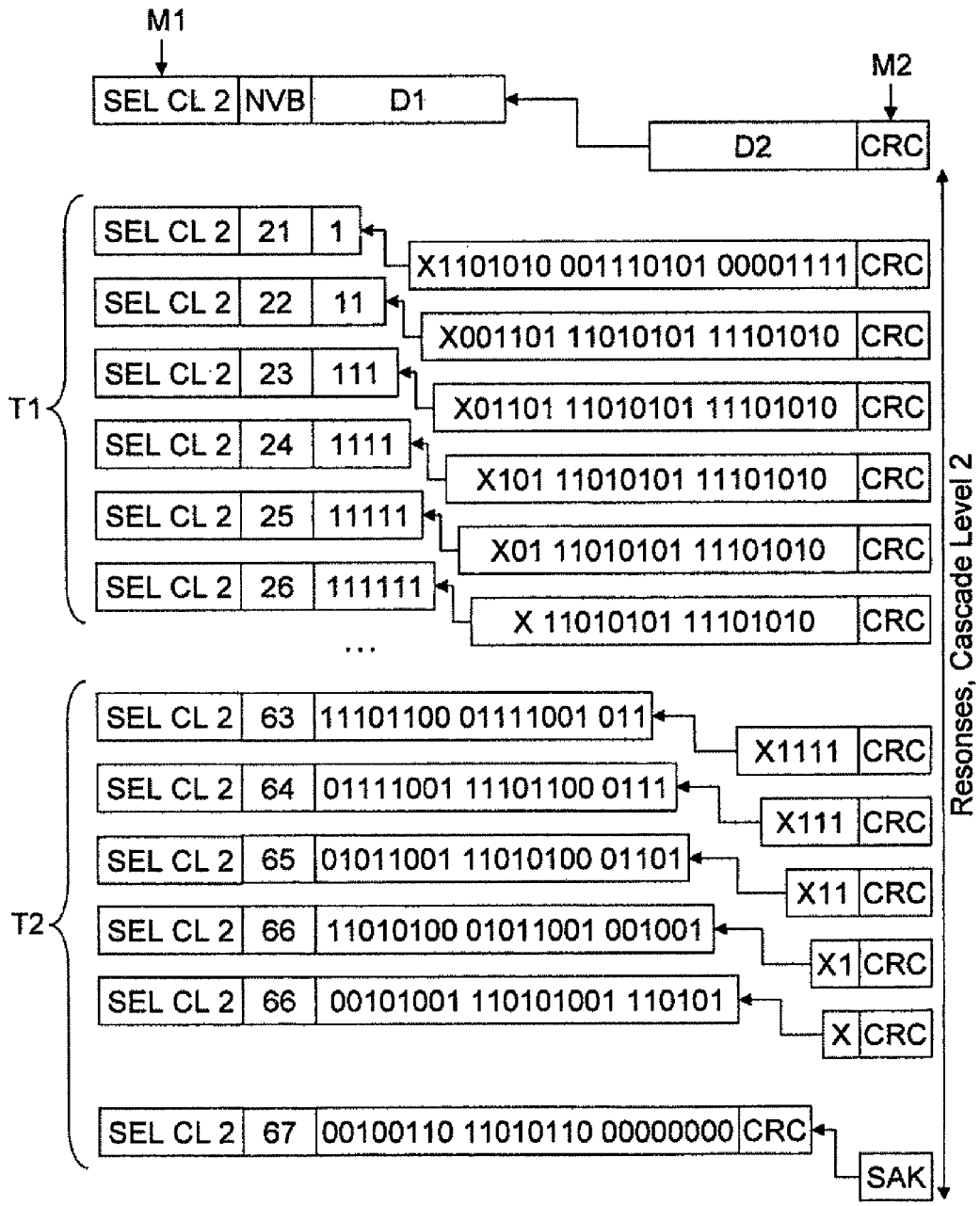

The figures are described as follows:

FIG. 1A flow chart reproducing a first embodiment of the inventive method;

FIG. 2 a schematic representation of the use of data fields in SEL commands according to an embodiment of the inventive method;

FIG. 3 a flow chart reproducing a second embodiment of the inventive method;

FIG. 4 a flow chart showing the generation of a serial number for a transponder according to a first embodiment of the inventive method;

FIG. 5 a flow chart reproducing the transmission of a response from the transponder to the reading device according to an embodiment of the inventive method;

FIG. 6 a schematic representation of a command sequence for transmitting challenges and responses according to an embodiment of the inventive method; and FIG. 7 a schematic representation of the transmission of a response from the transponder to the reading device as well as a subsequent response from the reading device to the transponder according to an embodiment of the inventive method.

In the following embodiments of the inventive method are explained with the help of a contactless near-field communication between an RFID transponder in the form of a portable data carrier and a reading device based on the standard ISO 14443-3. In the variants of the invention described in the following the dynamic binary-search method, which is sufficiently known from the state of the art, is used as anti-collision method.

In the dynamic binary-search method so-called SEL commands are transmitted between the reading device and the transponder in different cascade levels, with the objective of the exchange of the SEL commands being the selection or singling out of a transponder in the field of the reading device, so as to read out data from the singled out transponder. For this purpose subsequent SEL commands are emitted by the reading device within an anti-collision loop, wherein it is specified in every SEL command in a corresponding NVB field how many bits of the UID (i.e. of the serial number) of a transponder in the field are already known. The anti-collision loop starts with a SEL command, in which it is indicated by the NVB value "20" that no bit of the transponder's UID is known. Subsequently all transponders in the field respond to this command with their UID. Since the bits of the individual UIDs of the transponders differ in different bit positions, in the reading device a bit sequence with corresponding collisions is received, with the position of a collision being signified by "X" in the following.

A collision thus means that in the corresponding bit position at least two transponders in the field of the reading device differ with regard to their UID. The bit sequence up to the first occurring collision is consequently identical for all transponders. To select one of these transponders subsequently further subsequent SEL commands in the form of requests are transmitted, with the known bits of a transponder UID being already specified in the commands. In doing so, the bit of the collision can be set to 1 or to 0. Subsequently only the part of the UID which is unknown in the reading device is returned by the transponders containing the bit sequence specified in the request command. Subsequently, again via the correspondingly occurring collision, a new request with a larger number of known bits and corresponding NVB value can be transmitted. The method finally leads to a transmission of a bit sequence without collisions from the transponder to the reading device. At this time the method is ended, since now a UID of a transponder in the field is known. The transponder can be singled out through a so-called select command in which the NVB value is set to 70 (i.e. all bits of the UID are known). The selection thus conducted is confirmed by the transponder through a select acknowledgment SAK. Subsequently data can be read out from the selected transponder.

In the embodiment of the inventive method described in the following the corresponding SEL commands of the dynamic binary-search method are used for carrying out a so-called challenge-response authentication. The challenge-response authentication is sufficiently known from the state of the art and is based on the circumstance that from the reading device a challenge (e.g. in the form of a random number) is transferred to the transponder, which in turn generates a response, for example based on a shared secret between the reading device and the transponder. The response is returned to the reading device. Subsequently the authenticity of the response is checked in the reading device. For example it is determined whether the response was generated with the same secret as the original challenge.

FIG. 1 shows a first embodiment of the inventive method. After starting the anti-collision loop (step S1) in step S2 the number N of iterations is set to 1. In step S3 the SEL command to be used is fixed on the basis of the first cascade level, i.e. SEL:=code (cascade level 1). In step S4 the NVB value is set to 70, which means that in the subsequent anti-collision command the number of the known bits is set to the maximum value, Finally an anti-collision command AC is generated as corresponding SEL command with the NVB value of 70 and emitted by the reading device (step S5). The command here corresponds to a request for determining a UID of a transponder in the field of the reading device. The field following the NVB value is set to "08" in the command, characterizing a random serial number in the ISO 14443 standard. The value "08" is followed by a part of a challenge CH of the challenge-response authentication. The individual parts of the challenge here are signified in FIG. 1 as part 1, part 2, . . . , part i. The command ends with a checksum CRC. Instead of filling the field following the NVB value with "08", it is also possible to transmit a byte of the challenge CH already in this field.

In the case that in the field of the reading device an inventive transponder is disposed (i.e. a transponder supporting the inventive method), said transponder recognizes that the request does not serve to search a UID of a transponder, but to transmit a challenge. The transponder recognizes this by means of the atypical conduct that the anti-collision loop in its first iteration does not start with the NVB value of 20, which indicates that no bit is known yet of the UID of the transponder to be determined. An NVB value of 20 in the ISO 14443 standard corresponds to a number of zero known bits, since in this standard the two bytes of the command are also counted. After receipt of the request AC by the inventive transponder said transponder emits an acknowledgment SAK, which is received by the reading device in step S6. In step S7 it is checked whether already all parts of the challenge CH were transmitted. If this is not the case, the iteration counter is incremented by one in step S8 and step S3 is reverted to, so as to transmit a further part of the challenge CH to the transponder in a next request. The method is finally ended (step S9) when the complete challenge CH was transmitted.

A second, non-inventive transponder which by chance is also disposed in the response field of the reading device and does not support the inventive method, responds to the SEL commands emitted by the reading device only provided that its own UID is consistent with the challenge data which are emitted with the anti-collision command. In the ISO 14443 standard four bytes are used for the UID. This means that the probability of a consistency of the UID of a non-inventive transponder with corresponding challenge data amounts only to $1:2^{32}$ (approx. 1:4 billions). A disturbance of the transmission of a challenge by a non-inventive transponder is therefore highly unlikely.

In the above method the presence of further inventive transponders cannot be recognized. So as to achieve this, according to a further embodiment of the invention a transmission of the data fields intended for the UID is carried out in split frames, i.e. not the complete data field usable in an anti-collision command is used for transmitting challenge data.

FIG. 2 again illustrates the use of split frames. In a request AC emitted by a reading device, characterized by the SEL command of the cascade level n (CL n=cascade level n) and the corresponding NVB value, a data field D1 is transmitted which is shorter than a predetermined maximum length. This is indicated by a corresponding NVB value which reproduces that no all bits of the UID of a transponder are known. This means that the NVB value is smaller than the length of a UID of a transponder. In response to a transmitted split frame a transponder then transmits a corresponding response R containing a data field D2 whose length corresponds to the difference between the UID length and length of the data field D1. Furthermore the response R contains a corresponding checksum CRC. Within the data fields D1 and D2 in addition to UIDs any desired payload data can be transmitted, with examples of such payload data being reproduced in the bottom part of FIG. 2. According to the invention the data fields D1 and D2 are used in particular for transmitting corresponding challenges and responses in a challenge-response authentication.

FIG. 3 shows a flow chart according to a second embodiment of the inventive method, with the split frames described above being used. In contrast to the embodiment according to FIG. 1 the number of known bits is set to larger than zero, but smaller than the length of a UID. The steps S1 to S3 of FIG. 3 correspond to the steps S1 to S3 according to FIG. 1. In step S4 now the NVB value for the anti-collision command AC is no longer set to 70, but to 50, corresponding to a value of 3 bytes, which is shorter than the UID of a transponder. Analogously to FIG. 1 in step S5 now in the anti-collision command AC a part of the challenge CH is transmitted.

Since an anti-collision algorithm usually starts in the first iteration with NVB:=20, an inventive transponder in the field of the reading device recognizes in the atypical value of 50 that the inventive authentication value is carried out. Accordingly all inventive transponders in the field of the reading device respond by transmitting in the data field UID of the remaining length (i.e. in the data field D2 according to FIG. 2) a random number or, in an alternative variant, a series of "0" bits or a series of "1" bits. The response of an inventive transponder is indicated as R in FIG. 3 and is received in step S6.

As additional information that the transponder is an inventive transponder, furthermore in the response R in a predetermined position a bit collision is simulated, which can also serve as acknowledgment information to the reading device. In the right part of FIG. 3 in column C examples of responses returned to the individual anti-collision commands are reproduced. It is recognizable that every response contains a bit collision "X". In the case that the reading device recognizes a simulated bit collision in the predetermined position, it can conclude from this that an inventive transponder has received the challenge. Thus, if in accordance with a check in step S7 an expected (simulated) bit collision is given, the transmission of a further part of the challenge CH in a new iteration loop (step S9) is initiated, provided that a check in step S8 yields that not all parts of the challenge CH were transmitted yet.

In the case that a second inventive transponder is disposed in the response field of the reading device, very probably further bit collisions occur due to the different returned random numbers of the transponders. These further bit collisions are recognized by the reading device and correspond to unexpected bit collisions. Likewise, a second, non-inventive transponder, which by chance is also disposed in the response field of the reading device, responds to the emitted anti-collision command AC, provided that its own UID is consistent with the challenge data sent in the data field UID. Also in this case further bit collisions occur, which can be recognized by the reading device. In step S7 of FIG. 3 the recognition of unexpected bit collisions takes place through the reading device, which, upon the presence of an unexpected collision detects in step S10 that there is a further transponder in the response field of the reading device. As a consequence the anti-collision loop is ended, since the authentication method is disturbed by further transponders in the response field. Subsequently a conventional anti-collision method can be carried out so as to identify the transponders in the field of the reading device. Once the identification is finished, the transmission of the challenge can be continued, in that the next part of the not yet transmitted challenge is emitted. The precondition for this is that the transponders store the challenges emitted during the first run-through of the anti-collision loop.

After the successful completion of an anti-collision algorithm according to the state of the art a transponder is selected by means of its determined UID. In the standard ISO 14443 this takes place through emitting a select command with the parameter NVB=70, with this select command containing the UID of the transponder to be singled out. The transponder whose UID is consistent with the UID sent in the select command responds to the select command with a select acknowledgment SAK.

In the embodiment of FIG. 3 the problem is now that in the execution of a challenge-response authentication no serial number, but a random number is transmitted by the transponder. So as to select the transponder in the method of FIG. 3 nevertheless, the random numbers returned by the transponder are combined to form a serial number PUPI (PUPI=pseudo-unique ID) and the thus generated serial number, which is known in the transponder, is then used for selecting the transponder via a corresponding SEL command with the NVB value 70 (step S11). Since in the received responses of the transponder collisions were simulated so as to transfer an acknowledgment to the reading device, the corresponding bit positions of the collisions must be replaced by suitable bit values. For example the bit position of the collision always can be set to "0" or "1" uniformly.

FIG. 4 again illustrates the generation of a serial number PUPI from the random numbers returned by the transponder. The method steps represented in FIG. 4 correspond essentially to the method steps of FIG. 3. The step S11 is now represented as two partial steps S111 and S112. In the step S111 the NVB value for the select command is set to 70. In the step S112 the select command is finally transmitted. It is recognizable that the command now contains as UID the random numbers of the individual responses of the transponders returned beforehand. These responses again are reproduced in FIG. 4 in column C. In doing so, corresponding bit positions in which collisions occurred in FIG. 3 were replaced by a corresponding "1" bit.

After the transmission of the challenge CH to the transponder using one of the above-described methods, said transponder responds with a corresponding response in the authentication process. A possibility of emitting a corresponding response within the framework of an anti-collision method is reproduced in FIG. 5. The steps S1 to S11 here correspond essentially to the steps S1 to S11 according to FIG. 3. In contrast to FIG. 3, however, in step S3 the cascade level is set to 2 (SEL=code (cascade level 2)). The incrementation of the cascade level is necessary, since with the emission of the SEL command with the NVB value 70 in step S11 of FIG. 3 a selection was already carried out. Usually in the standard ISO 14443 the cascade level 2 is provided for determining the second part of a double or triple size serial number and starts with a restart, i.e. the NVB value is set to 20.

According to FIG. 5 however, now the second run-through of the anti-collision loop is used to transmit a response of the authentication method from the transponder to the reading device. In doing so, the reading device in step S5 emits as anti-collision command a select command with the NVB value 20, which means that the corresponding data field D1 has the length of zero or is not present. Accordingly, the consequence is that in the response R of the transponder received in step S6 a data field D2 with the length of a UID is transmitted. The response R now contains a part of the response RES of the authentication process generated by the transponder. The individual parts of the responses are denoted in the right part of FIG. 5, again in column C. In the bottommost response in the column the end of the response is denoted by a simulated bit collision X, with the bit positions following the bit collision being filled up with fillers in the form of "0" bits.

Analogously to the method of FIG. 3 in step S7 of FIG. 5 the check takes place for whether an unexpected bit collision has occurred. If this is not the case, in a next iteration of the anti-collision loop the next part of the response is transmitted, until the complete response was received in the reading device (steps S8 and S9). In the case that an unexpected collision is given, it is detected that a further transponder is present in the field, and subsequently, if applicable, the conventional anti-collision method is carried out, in which firstly all present transponders are identified.

If, finally, all parts of the response were transmitted from an inventive transponder to a reading device, the transponder can again be selected through a corresponding SEL command with the NVB value 70, as denoted in step S11 of FIG. 5. However, since no UID was determined in the response-authentication process, instead of the UID of the step S11 one of the parts of the response is used as serial number in the SEL command. In response to the SEL command the transponder, in accordance with the standard ISO 14443, sends a select acknowledgment SAK.

For a mutual authentication or more complex authentication protocols the exchange of the required data from the transponder to the reading device and vice versa can be repeated as frequently as desired and alternated as frequently as desired. According to the invention, herein the same, above-described mechanisms can be used. Accordingly, in an ISO-14443 system an authentication process within the framework of an anti-collision loop or several anti-collision loops can be alternated. Therein the protocol run can be predetermined or controlled through the cascade level and the exchanged data. For example in cascade level 1 the selection of the inventive data carrier could take place, and in cascade level 2 the data transmission from the reading device to the transponder, and in cascade level 3 the data transmission from the transponder to the reading device.

FIG. 6 shows in schematic representation an exemplary summary of messages transmitted within the challenge-response authentication. In the top part the transmission of the challenge data CH in an anti-collision loop of the cascade level 1 is reproduced in individual parts part 1, part 2, . . . , part i. FIG. 6 here shows the transmission of the individual parts in split frames, which is reproduced by the NVB value of 50. In response to each SEL command a random number is received by the transponder as UID. After transmitting the challenge data the selection of the transponder with the above-described PUPI, which is composed of the random numbers transmitted from the transponder to the reading device, takes place through the SEL command with the NVB value of 70. The selection is confirmed by an SAK acknowledgment. Analogously to the transmission of the challenge data CH the transmission of the response RES now takes place in an anti-collision loop of the cascade level 2. The NVB value of the SEL command, which is emitted by the reading device, in doing so is set to the value 20, so that the individual parts part 1, part 2, . . . , part i of the response are transmitted in a split frame of maximum size. Finally, after concluding the transmission of the response, a SEL command with the NVB value of 70, containing a response received beforehand, is emitted. The transponder recognizes the part of the response in the SEL command and returns a select acknowledgment SAK to the reading device.

FIG. 7 shows a possible variant of the transmission of responses from the transponder to the reading device and subsequently from the reading device to the transponder within the framework of a mutual authentication. The transmission of the responses here takes place in the cascade level 2. In the first line of FIG. 7 here generally the structure of the exchanged messages with corresponding NVB value and data fields D1 or D2 is reproduced. The message M1 here represents a command emitted by the reading device and the message M2 a response emitted by the transponder. In the top part T1 of FIG. 7 here a transmission of a response from the transponder to the reading device is reproduced by way of example. It is recognizable that the NVB values of the SEL commands are incremented step by step, by one bit per iteration. In the first bit position of the split frame sent by the transponder in response to the first SEL command of the reading device here a bit collision is simulated, so as to signal to the reading device that the transponder is an inventive transponder. The data transmitted by the reading device in the split frame in the corresponding data field D1 become one bit longer with each iteration and can e.g. be filled up with a sequence of "1" bits, "0" bits or random numbers.

If the response was transmitted completely from the data carrier to the reading device within the data field D2 of the message M2, in the next step the response can be transmitted from the reading device to the data carrier. This is reproduced in the part T2 of FIG. 2. Therein the NVB value is set to a value that is as high as possible, so as to render the number of data bits in the data field D1 in the part of the split frame sent by the reading device as large as possible. The rest of the split frame sent by the transponder can be filled up in the data field D2 e.g. with a sequence of "1" bits, "0" bits or random numbers.

If, during an anti-collision loop, there occurs in FIG. 7 a bit-wise collision in the part of the split frame sent by the transponder or if, when using a simulated collision a further unexpected collision takes place in a different bit position, the reading device can conclude from this that at least one further data carrier is present in the response field of the reading device.

In the inventive method it is provided in particular that the transponders support also the execution of the anti-collision loop according to the actual purpose, i.e. that the selection of a transponder can be carried out according to its serial number UID. This standard function can be activated e.g. when an anti-collision loop starts in the cascade level 1 with the normally used standard value 20 h in the NVB parameter (zero bits of the UID are known). In this case the inventive transponders respond in a split frame with their own UID, as described in the standard ISO 14443. In contrast, if the start value is larger than 20 h, the inventive method for carrying out the challenge-response authentication is carried out. This enables the inventive reading device, after the occurrence of an unexpected collision in a challenge-response authentication carried out according to the invention, to abort the anti-collision loop so as to restart it with the aim of selecting one single transponder.

Collisions can be avoided in the inventive method in that individual transponders are set to the HALT mode and thereby muted upon finishing an anti-collision loop. In the case that the inventive challenge-respond method fails, the challenge-response authentication based on the state of the art can be carried out for a selected transponder also in the protocol mode, provided that the transponder supports a corresponding communication protocol.

The particular advantage of the above-described variants of the inventive method is that a challenge-response method can be carried out with a transponder without the transponder having to support a corresponding communication protocol.

This facilitates the implementation of the challenge-response method e.g. in software or, if applicable, as a state machine, and thereby allows the production of inexpensive transponders. What is more, valuable time is economized in the data transmission. Likewise, the presence of more than one transponder at the same time in the response field of the reading device is recognized in accordance with one embodiment of the inventive method, so that the reading device can react to this with appropriate measures.

In the case that the transponder supports a transmission protocol for the challenge-response authentication, likewise time is economized in carrying out the authentication. In this case the data transmission can be started at once in the protocol in an encrypted fashion, since a mutual authentication has already taken place and possibly required keys are already available.

The invention claimed is:

1. A method for challenge-response authentication between a reading device and a transponder based on a contactless data transmission, the method comprising the steps:
   transferring challenge data from a reading device to a transponder, the challenge data being transferred within a first anti-collision loop, the first anti-collision loop including one or more commands of an anti-collision method that determine transponder identification data, wherein at least one of the one or more commands contains challenge data in a data field which is used to specify transponder identification data, and at least one of the one or more commands contains a parameter value to indicate that the data field of the one or more commands contains challenge data instead of transponder identification data;
   recognizing via the transponder that the challenge data is contained in the received one or more commands based on the parameter value;
   processing via the transponder the transferred challenge data on the basis of the challenge-response authentication; and
   running through a second anti-collision loop after transmission of the challenge data of the first anti-collision loop;
   wherein, in the second anti-collision loop, response data based on the challenge-response authentication are transmitted from the transponder to the reading device by one or more responses of the anti-collision method, and
   wherein, in the second anti-collision loop, the response data are contained in a data field of the response, and the data field serves to transmit transponder identification data.

2. The method according to claim 1, wherein the anti-collision method is a binary search method.

3. The method according to claim 2, wherein the data field for specifying the transponder identification data is a UID data field for specifying the UID of a transponder.

4. The method according to claim 3, wherein the parameter value is an NVB value of a SEL command, with the NVB value indicating the number of bits of the transponder's UID known to the reading device, and whereby the NVB value is used to indicate to the transponder, according to which at least a part of the bits of the UID of the transponder are known, that in the UID data field of the SEL command challenge data are transmitted instead of the UID.

5. The method according to claim 1, further comprising transferring via the transponder, after receipt of a respective command, a response to the reading device, whereupon the reading device after receipt of the response transfers to the transponder a new command with a part of the challenge data not yet transferred to the transponder, provided that all challenge data were not yet transferred to the transponder.

6. The method according to claim 5, wherein the anti-collision method is a binary search method and/or the contactless data transmission takes place according to the standard ISO 14443; and
   the respective response of the transponder is an SAK acknowledgment.

7. The method according to claim 5, wherein the response of the transponder comprises a data field that is used for transmitting transponder identification data of the transponder, wherein the data field contains a random number and/or a predetermined bit sequence instead of the transponder identification data, and using as data field a UID data field for transferring the UID of the transponder to the reading device.

8. The method according to claim 7, wherein the response includes information indicating that the response contains a random number and/or a predetermined bit sequence, and
   the method further comprises using the reading device to recognize this information.

9. The method according to claim 8, wherein simulation of a bit collision in the response is used to indicate that the response contains a random number and/or a predetermined bit sequence.

10. The method according to claim 8, further comprising detecting the presence of several transponders in the field of the reading device when the reading device receives a response which does not include the information indicating that the response contains a random number and/or a predetermined bit sequence.

11. The method according to claim 8, further comprising using the random numbers and/or predetermined bit sequences of the responses for the selection of the transponder through the reading device after transfer of the challenge data.

12. The method according to claim 1, wherein the anti-collision method is a binary search method and/or the contactless data transmission takes place according to the standard ISO 14443; and
   the method further comprising transmitting within the further first anti-collision loop one or more SEL commands from the reading device to the transponder, wherein the SEL commands are responded to by the transponder with responses containing response data and wherein the NVB indicates value in a respective SEL command that no bit of the transponder's UID is known to the reading device.

13. The method according to claim 12, wherein the second anti-collision loop is ended, and in a selection command of the anti-collision method the reading device transmits to the transponder response data received from the transponder beforehand.

14. The method according to claim 1, wherein within the second anti-collision loop, after transmission of the response data from the transponder to the reading device, response data are again transmitted from the reading device to the transponder.

15. The method according to claim 14, wherein the anti-collision method is a binary search method and/or the contactless data transmission takes place according to the standard ISO 14443; and
   transmitting the response data from the transponder to the reading device in such a fashion that from the reading device to the transponder there are transferred subsequent SEL commands which are responded to by the transponder with responses containing response data, wherein the NVB values of the SEL commands indicate that merely a part of the bits of the UID of the transponder is known, and wherein in the respective responses a bit collision is simulated.

16. The method according to claim 14, including transferring the response data from the reading device to the transponder in the UID data field of subsequent SEL commands.

17. A system for challenge-response authentication based on a contactless data transmission, the system comprising a reading device and a transponder, the reading device and the transponder being configured such that:
   challenge data are transferred from the reading device to the transponder, the challenge data being transferred within first anti-collision loop, the first anti-collision loop including one or more commands of an anti-collision method that determine transponder identification data, wherein at least one of the one or more commands contains challenge data in a data field that is used to specify transponder identification data;
   at least one of the one or more commands contains a parameter value to indicate that the data field of the one or more commands contains challenge data instead of transponder identification data;
   based on the parameter value, the transponder recognizes that challenge data are contained in the received one or more commands, and the transponder processes the transferred challenge data on the basis of the challenge response authentication; and
   the reading device and the transponder run through a second anti-collision loop after transmission of the challenge data of the first anti-collision loop;
   wherein, in the second anti-collision loop, response data based on the challenge-response authentication are transmitted from the transponder to the reading device by one or more responses of the anti-collision method, and
   wherein, in the second anti-collision loop, the response data are contained in a data field of the response, and the data field serves to transmit transponder identification data.

18. A reading device for use in a system as recited in claim 17, arranged so that in operation the reading device emits the challenge data within the first anti-collision loop by means of one or more commands of the anti-collision method for determining transponder identification data,
   wherein the one or more commands respectively contain challenge data in a data field that is used for specifying transponder identification data, and
   wherein at least one of the one or more commands that the data field of the command or the commands contains challenge data instead of transponder identification data.

19. A transponder for use in a system according to claim 17, wherein in operation, the transponder is configured to recognize, with the help of the parameter value in the received one or more commands of the anti-collision method, that challenge data are transferred in the one or more commands of the first anti-collision loop, whereupon the transponder processes the transferred challenge data on the basis of a challenge-response authentication.

20. The method according to claim 1, wherein the contactless data transmission takes place according to the standard ISO 14443.

21. The system according to claim 17, wherein the anti-collision method is a binary search method.

22. The system according to claim 17, wherein the contactless data transmission takes place according to the standard ISO 14443.

* * * * *